May 21, 1946.                W. B. ZERN                 2,400,862
                             WORK STAND
                         Filed May 29, 1942           4 Sheets-Sheet 1

Warren B. Zern INVENTOR.

BY
Victor J. Evans & Co.
ATTORNEYS

May 21, 1946.  W. B. ZERN  2,400,862
WORK STAND
Filed May 29, 1942  4 Sheets-Sheet 2
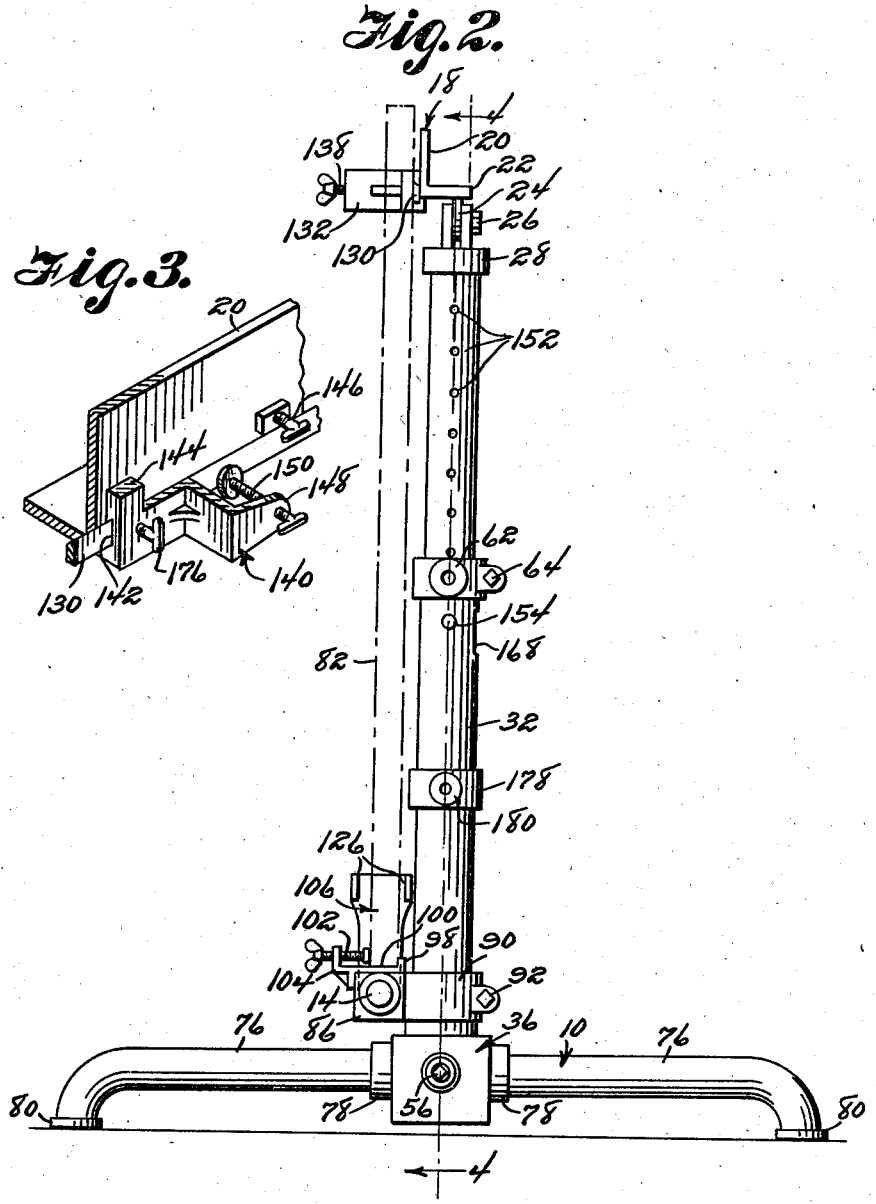

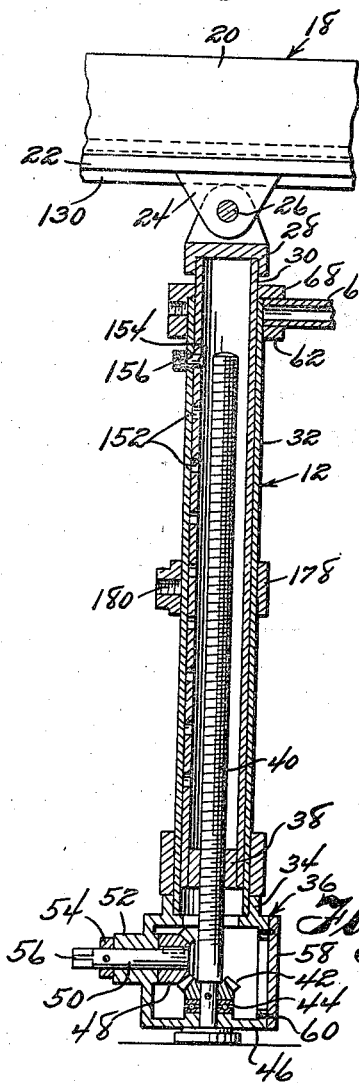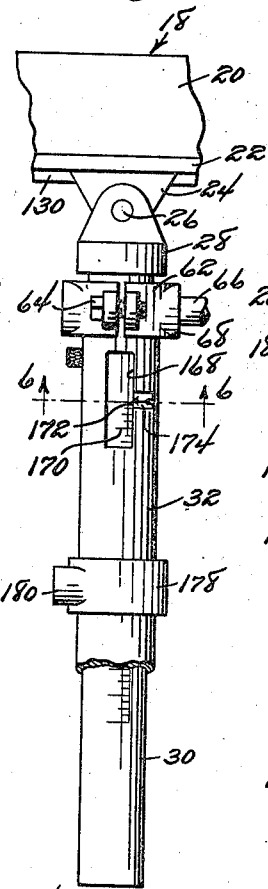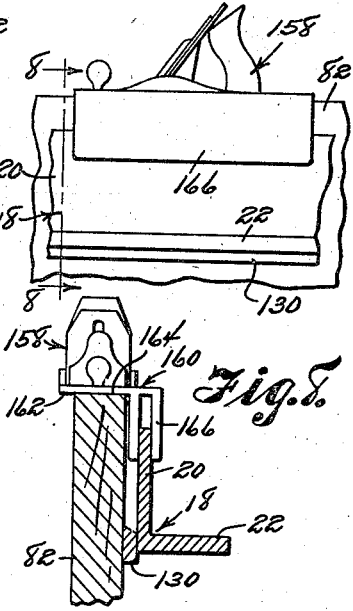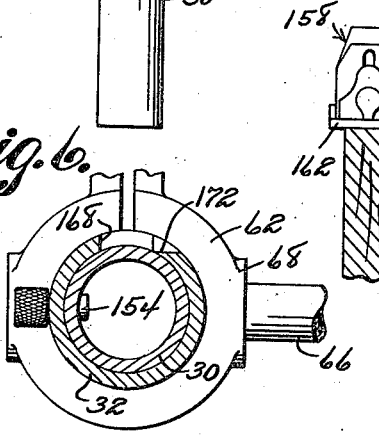

May 21, 1946.   W. B. ZERN   2,400,862
WORK STAND
Filed May 29, 1942   4 Sheets-Sheet 4

Warren B. Zern INVENTOR.
BY
Victor J. Evans & Co.
ATTORNEYS

Patented May 21, 1946

2,400,862

UNITED STATES PATENT OFFICE 2,400,862

WORK STAND

Warren B. Zern, Pottstown, Pa.

Refiled for abandoned application Serial No. 339,053, June 6, 1940. This application May 29, 1942, Serial No. 445,048

4 Claims. (Cl. 144—296)

My invention relates to wood working apparatus particularly suitable for finishing doors, window sashes and the like to predetermnied sizes, measuring and locating accessories thereon, and has among its objects and advantages the provision of an improved support.

This application is a refile for applicant's abandoned application Serial No. 339,053, filed June 6, 1940.

In the accompanying drawings:

Figure 2 is an end view;

Figure 3 is a perspective view of a portion of a wood working tool guide and work clamp;

Figure 4 is a sectional view taken along the line 4—4 of Figure 2;

Figure 5 is a view similar to Figure 4 but illustrated in elevation;

Figure 6 is an enlarged sectional view along the line 6—6 of Figure 5;

Figure 7 is a diagrammatic side view of a tool guide illustrating a wood working plane associated therewith;

Figure 8 is a sectional view taken along the line 8—8 of Figure 7;

Figure 9 is a view similar to Figure 8 but illustrating the work in its finished form and the manner in which the tool guide accurately limits further cutting of the work when once it has been brought to a predetermined dimension;

Figure 1:
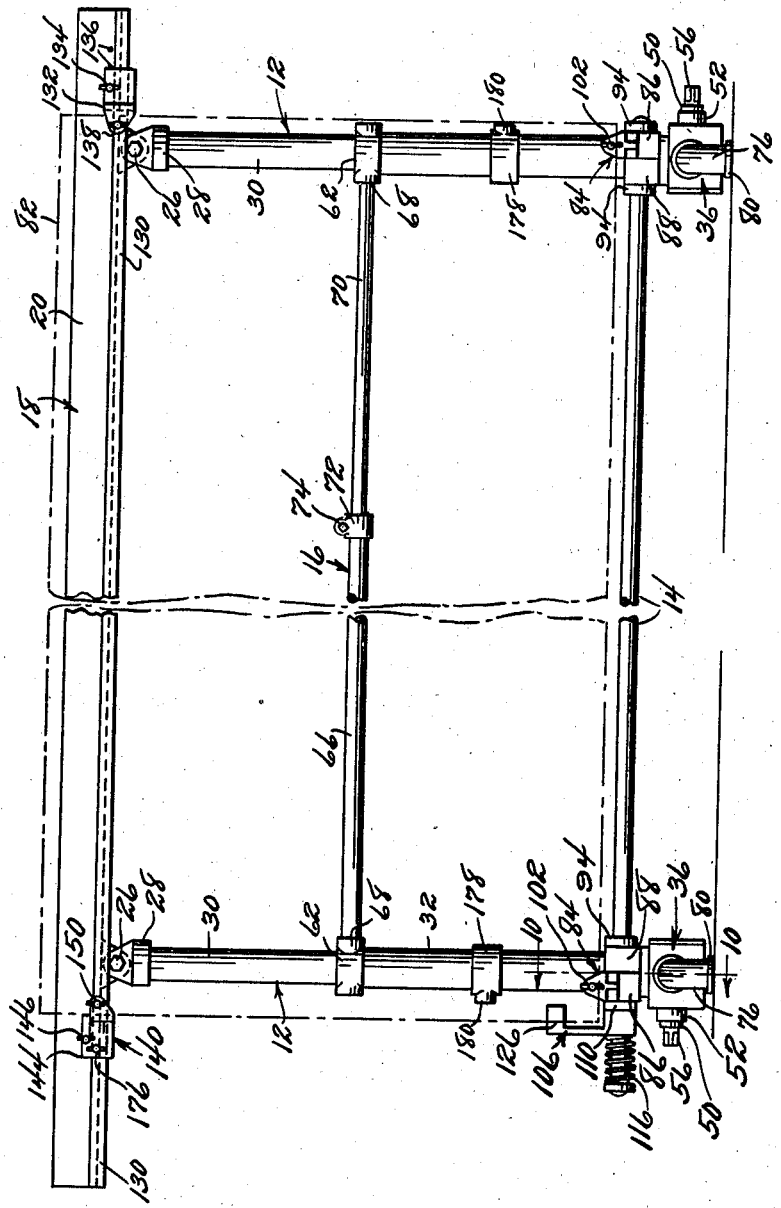
Figure 1 is a fragmentary side elevational view.

In the embodiment selected for illustration, I make use of two bases 10, each carrying an upright post 12. These posts are interconnected by horizontal bars 14 and 16 and a horizontal tool guide 18 in the nature of an L having its tool guiding flange 20 lying in a vertical plane and its horizontal flange 22 provided with ears 24 pivotally connected at 26 with caps 28 mounted on the upper ends of the respective posts 12.

Each post 12 comprises an inner tube 30 to which is fixedly attached one of the caps 28, see Figure 4. This tube is slidable in an outer tube 32 having its lower end secured inside an annular flange 34 on a gear housing 36. Inside the lower end of the tube 32 is secured an internally threaded collar 38 having threaded connection with a screw 40 having its lower end secured to a bevel gear 42 resting on a thrust bearing 44 mounted on the bottom wall 46 of the gear housing 36. A second bevel gear 48 meshes with the bevel gear 42 and is keyed to a shaft 50 rotatably supported in a bearing 52 attached to one wall of the housing 36.

A collar 54 is attached to the shaft 50 and coacts with the gear 48 through their engagement with the opposite ends of the bearing 52 to restrain the shaft from axial movement. A head 56 is formed at the outer end of the shaft 50 for connection with a socket wrench of the crank type through the medium of which the shaft may be rotated for turning the screw 40 and raising and lowering the inner tube 30 relatively to the outer tube 32. One wall of the gear housing 36 is provided with a cover plate 58 supported by screws 60.

To the upper ends of the outer tubes 32 are fixedly secured split collars 62 made secure through tightening of the bolts 64. See Figs. 2 and 5. These collars constitute supports for the opposite ends of the horizontal bar 16 and, to this end, the bar 16 is made of telescopically related sections 66 and 70, the section 66 being tubular and having one of its ends secured in a socket 68 in one of the collars 62, while in the socket 68 of the other collar 62 is secured one end of the section 70 which is preferably in the form of a length of rod that has its other end slidable in the free end of the section 66. The free end of the tube 66 is split and provided with a collar 72 provided with a tightening bolt 74, so that the tubular section 66 may be fixedly clamped to the rod 70. See Fig. 1. Thus the horizontal bar 16 is made up of the tubular section 66 and the rod 70 so that the two posts 12 may be accurately aligned one with the other, with the bar 16 constituting a brace which supports the upper ends of the tubes 32 in a firm manner.

The bases 10 each comprises two tubes 76 secured in sockets 78 on the gear housing 36. See Fig. 2. The outer ends of the tubes 76 are bent downwardly and are provided with floor-engaging pads 80. The tubes 76 are of such lengths as to effectively balance the posts 12 in their upright positions.

Figures 1 and 2 illustrate a door 82 in the support and at rest on stops 84 each comprising a body 86 lying adjacent a bearing 88 on a split collar 90 fixedly secured to one of the tubes 32, as by a bolt 92. The bar 14 constitutes a shaft rotatably mounted in the two bearings 88. Flanges 94 are fixed to the shaft 14 and respectively engage the bearings 88, with the bodies 86 lying in engagement with the opposite sides of the bearings. To the bodies 86 are fixedly secured clamps 96 having upstanding flanges 98 for engaging one side of the door 82, with the lower edge of the door resting on the flat faces 100 of the clamps 96. Clamp bolts 102 are threaded through upstanding lugs 104 on the clamps for engaging the opposite side of the door to clamp the latter firmly against the flanges 98.

Figure 10:
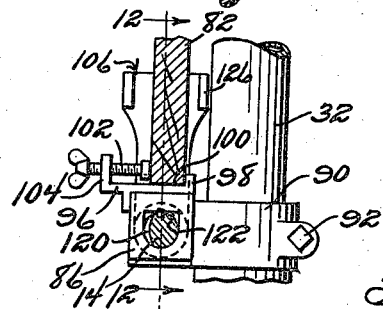
Figure 10 is a sectional view along the line 10—10 of Figure 1.
Figure 11:
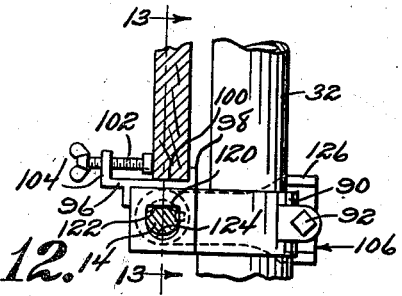
Figure 11 is a view similar to Figure 10 but illustrating the work support in a different position for changing the elevation of the work.
Figure 12:
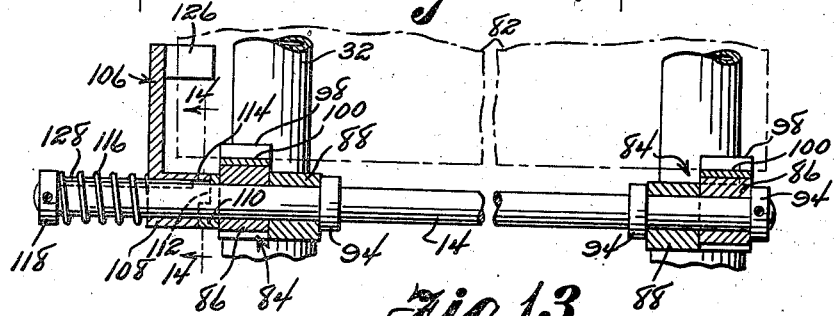
Figure 12 is a sectional view along the line 12—12 of Figure 10.
Figure 13:
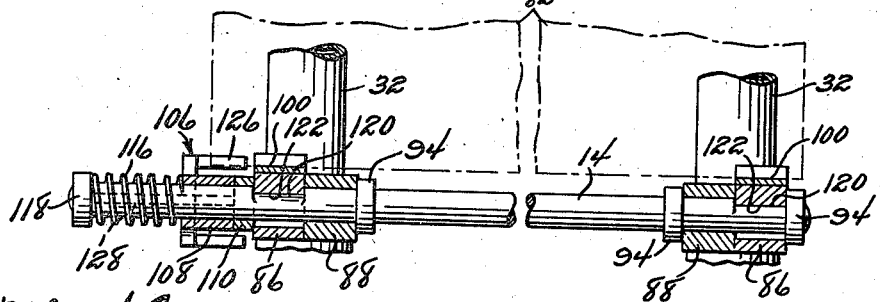
Figure 13 is a sectional view along the line 13—13 of Figure 11.
Figure 14:
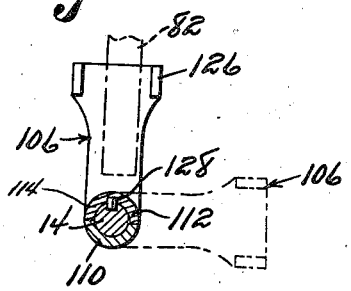
Figure 14 is a sectional view along the line 14—14 of Figure 12.

Upon one end of the shaft 14 is mounted a telltale 106 having a hub 108 (Fig. 12) slidably mounted on the shaft. Between the hub 108 and the adjacent body 86 is mounted a collar 110 fixedly secured to the collar 90 and rotatably supporting the shaft 14. This collar is provided with a notch 112 for the reception of a lug 114 on the hub 108 to limit rotation of the telltale through an arc of ninety degrees from a vertical position, as in Figures 10, 12 and 14 to a horizontal position, as in Figures 11 and 13. A compression spring 116 is interposed between the hub 108 and a collar 118 attached to the shaft 114.

The portions of the shaft 14 extending through the bodies 86 are cut away at 120 (Figs. 10, 11 and 12) to provide eccentrics, and the bodies are provided with openings having flat upper walls 122 and curved bottom walls 124 conforming to the diameter of the shaft 14. With the telltale 106 positioned vertically, the eccentrics are so positioned as to bring the full diameter of the shaft 14 vertically inside the openings in the bodies 86 to support the clamps 96 in their uppermost positions. Rotation of the shaft ninety degrees from the position of Figures 10 and 13 brings the faces 120 of the eccentrics horizontally for engagement with the flat faces 122 to drop the clamps 96 to their lowermost positions. The spring 116 frictionally supports the telltale 106 in its vertical position. The telltale 106 is provided with two lugs 126 between which the bottom end of the door 82 is positioned when the telltale is in its vertical position. These lugs function as an obstruction to the door unless the telltale is positioned vertically to require the workman to bring the telltale to its proper vertical position. A key 128 (Fig. 14) slidably connects the hub 108 with the shaft 14 for relative longitudinal movement.

To the flange 20 of the tool guide 18 is connected a guide bar 130 extending the full length thereof. See Figs. 1 to 3. This guide bar approximates a dovetail in cross section and constitutes a rest engageable with the same face of the door 82 as the flanges 98 abut along the upper side margin thereof. The top end of the door 82 is engageable with a stop 132, see Figure 1, secured to the flange 20 by a bolt 134 selectively receivable in openings 136 in the flange 20, so that the stop may be adjusted longitudinally of the flange for doors of predetermined lengths. This stop is provided with a clamp bolt 138 which may be turned into engagement with the door 82 for holding the latter firmly against the bar 130.

To the opposite end of the flange 20 is connected a second clamp 140 having a groove 142 slidably receiving the bar 130. See Fig. 3. This clamp includes an abutment 144 engageable with a stop bolt 146 attached to the flange 20. Moving the clamp 140 to position the abutment 144 against the bolt 146 positions the clamp with respect to the bottom end of the door. The clamp includes an arm 148 provided with an adjustable clamp bolt 150 which may be clamped against the door for holding the latter against the bar 130. While the two screws 40 support the tool guide 18 for all practical purposes, means are provided for latching the tubes 30 and 32 against accidental rotation. In Figure 4, the tube 30 is provided with a plurality of openings 152 spaced two inches apart for selective reception of a pin 154 insertable through an opening 156 in the tube 32.

Figures 7, 8 and 9 illustrate a wood working tool 158, which may comprise a hand operated or motor driven plane. This tool is provided with a mount 160 having a flange 162 engageable with the upper edge 164 of the door 82. A channel guide 166 slidably receives the flange 20 to guide the tool. Figure 8 illustrates the flange 162 as being spaced some distance above the upper edge of the flange 20, while Figure 9 illustrates the flange 162 as engaging the flange 20 to restrain the tool mount from downward movement beyond the position shown.

Each tube 32 is provided with a window 168 for exposing a scale 170 on its respective tube 30, see Figure 5. The tube 32 is provided with a feather edge 172 provided with an arrow or index line 174 coacting with the scale to indicate the position of the tool guide 18.

In operation, the door 82 is placed in position on the stops 84 and made secure through tightening of the clamp bolts 102, the tool guide 18 having been adjusted to the width of the door being trimmed. The finished width of the door is equal to the distance between the upper edge of the flange 20 and the faces 100 of the stops 84 with the telltale 106 positioned vertically, as in Figures 10 and 12. The upper edge of the door is made secure through tightening of the bolts 138 and 150. The first edge of the door is trimmed with the telltale 106 positioned horizontally. As the first edge is trimmed down to the level of the upper edge of the flange 20, the door is reversed edge for edge and again made secure. The telltale 106 is then turned to its vertical position which elevates the door so that the second edge may be trimmed down to the level of the upper edge of the flange 20, at which time the door is trimmed to proper width.

The clamp 140 is provided with a setscrew 176 engageable with the guide 130 to latch the latter to the guide bar. The stop 132, as well as the clamp 140, is slidably connected with the guide bar 130.

Each of the tubes 32 is provided with an auxiliary collar 178 having a threaded socket 180 for connection with auxiliary devices (not shown).

Without further elaboration, the foregoing will so fully illustrate my invention, that others may, by applying current knowledge, readily adapt the same for use under various conditions of service.

I claim:

1. In a wood working stand, adjustable stops engageable with one edge of work to be trimmed to a predetermined width, means for adjusting said stops to first and second positions, a first guide, means for adjusting said first guide relatively to said stops comprising two posts each having two telescopically related members, one member of each post supporting one of said adjustable stops and the other member of each post supporting the first guide, screw means for adjusting the members in each post longitudinally to vary the spacing between the first guide and said adjustable stops, a brace means between one member in one post and the corresponding member in the other post, said first guide being in the nature of an L in cross section having one flange bolted to said other member of each post, said first mentioned means comprising bearings mounted on one member of each post, a shaft rotatable in said bearings, eccentrics on said shaft co-acting with said adjustable stops to shift the latter to said first and second positions through rotation of the shaft, a trimming tool guide slidable on said first guide for trimming the work along the edge opposite the edge supporting said stops, means on said first guide co-acting with said tool guide to limit the cutting depth of the tool when trimming the first edge of the work with said stops in said first position and for subsequently limiting the cutting depth of the tool when the work is reversed edge for edge on said stops with the latter in second position to trim the work to said predetermined width, clamp means for the work slidably supported on one flange of the first guide, and a tell-tale lever connected with said shaft for imparting rotation thereto.

2. In a work holding stand, a pair of spaced posts, each of said posts having two telescopically related members, screw means for adjusting the members in each post, a bearing mounted at the lower end of each post, a shaft journaled to turn in said bearings, said shaft having eccentric portions, a body engaging each eccentric portion of the shaft having a work supporting surface on the top thereof, said body being mounted for vertical translatory movement by the eccentric portions through turning of the shaft, and tool guide means mounted on the upper ends of said posts.

3. A work supporting stand comprising a pair of vertical posts each formed with relatively slidable telescopically related members, said posts being adjustably connected to be aligned and supported as a unit, a bearing element carried by the lowermost member of each post, a shaft supported in the bearing elements, eccentric portions on the shaft, a work supporting body engaging each of the respective eccentric portions for vertical translatory movement by such eccentric portions upon turning of the shaft, tool guide means mounted on the uppermost member of each post, means for adjusting the telescopically related members to adjust the position of the tool guide upwardly or downwardly with reference to the work supporting bodies, a lever device on the shaft and movable to one position to rotate the shaft to move the eccentrics to position the work supporting bodies to dispose the work in one position with respect to the tool guide, and to another position to rotate the shaft to move the eccentrics to position the work supporting bodies to dispose the work in another position with respect to the tool guide, and clamp devices respectively carried by the tool guide means and the work supporting bodies.

4. A work supporting stand comprising a substantially horizontal tool guide, work-supporting members located below the guide, rotatable cams supporting said members for adjustment upwardly or downwardly with relation to the guide, said members adapted when in their lower position to support the work with an edge portion thereof extending above the guide and said members adapted when in their upper position with the work reversed thereon to support the work with a portion of its opposite edge extending above the guide, means by which the cams may be turned to move said members from one of their positions to the other and means by which the tool guide may be adjusted upwardly or downwardly with relation to the lower or upper position of the work-supporting members, whereby to enable both edges of the work to be trimmed to an equal extent.

WARREN B. ZERN.